Sept. 28, 1943.   C. NORTON   2,330,443
CONTROL MECHANISM
Filed May 28, 1941
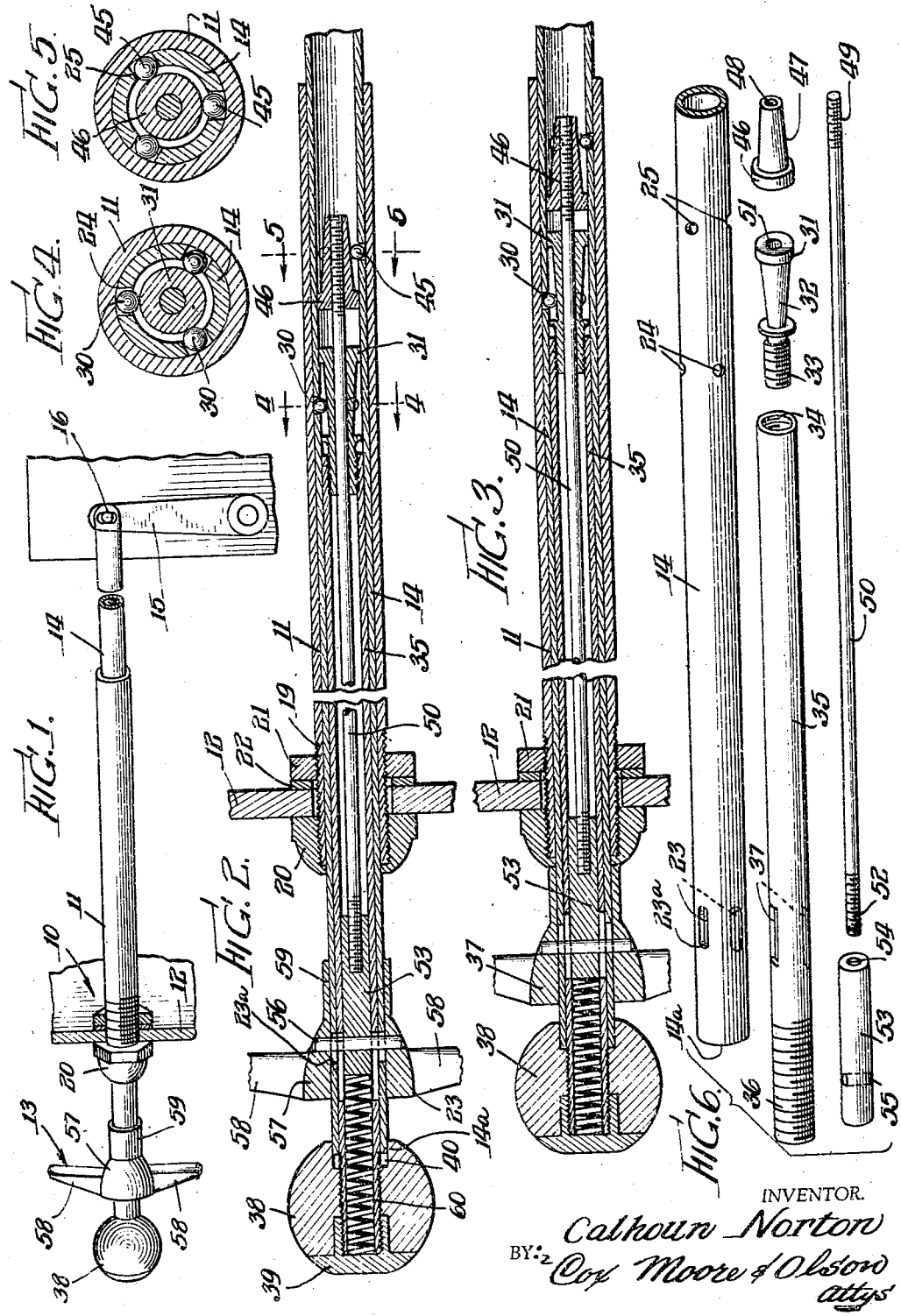
INVENTOR.
Calhoun Norton
BY: Cox Moore & Olson
attys Patented Sept. 28, 1943

2,330,443

UNITED STATES PATENT OFFICE 2,330,443

CONTROL MECHANISM

Calhoun Norton, Chicago, Ill., assignor to Arens Controls, Inc., Chicago, Ill., a corporation of Illinois Application May 28, 1941, Serial No. 395,559

15 Claims. (Cl. 74—503)

This invention relates to control mechanisms, particularly of the type adapted to releasably retain a controlled device in a plurality of adjusted positions.

It is an object of the invention to provide a control mechanism, of the type adapted to be releasably held or locked in a plurality of adjusted positions, having holding or locking mechanism or means of improved locking efficiency.

More specifically, it is an object of the invention to provide holding or locking means for control mechanisms of the type stated, which mechanism and means provide increased and controlled locking efficiency and resistance to movement of the control mechanism in opposite directions of travel; and wherein the holding forces and resistance to movement, if desired, may be substantially equal for movements in either direction.

A further object of the invention is to provide a holding or locking mechanism having increased locking effectiveness with respect to the handle release forces required to overcome the holding action, whereby to provide an effective holding mechanism which is smoother, more uniform and reliable in operation, and wherein jamming of the parts is eliminated.

A still further object of the invention is to provide, in a control mechanism of the type stated, an improved handle structure.

Various other objects, advantages, and features of the invention will appear from the following specification when taken in connection with the accompanying drawing wherein a preferred embodiment is set forth for purposes of illustration.

In the drawing, wherein like reference numerals refer to like parts throughout:

Fig. 1 is a general assembly view of a control mechanism constructed in accordance with the principles of the invention;

Fig. 2 is a longitudinal sectional view of the mechanism of Fig. 1, on an enlarged scale, and showing the organization of the parts;

Fig. 3 is a view similar to Fig. 2 but showing the control mechanism in release position;

Figs. 4 and 5 are transverse sectional views through the holding or locking means, on a further enlarged scale and taken on the lines 4—4 and 5—5, respectively, of Fig. 2; and Fig. 6 is an exploded view showing certain of the parts of the structure, in perspective detail.

Referring more particularly to the drawing, and first to Fig. 1 thereof, it will be seen that the control mechanism, generally indicated by the numeral 10, comprises in general a main frame member or housing sleeve 11 adapted to be secured to a support structure 12, a handle structure generally indicated by the numeral 13, and an operating member or sleeve 14 longitudinally reciprocable within the housing sleeve 11 and adapted to be secured to the controlled device 15. The controlled device may be any suitable operating mechanism which it is desired to move to and releasably retain in a plurality of adjusted positions. The controlled device may be secured to the operating sleeve, to be operated thereby, in any desired manner such as by means of a suitable pivot connection as indicated at 16. The support 12 may for example be the dashboard of an automotive or aircraft vehicle, in an installation wherein the operated device for example comprises a part of an automotive or aircraft vehicle structure.

Referring to Fig. 2 it will be seen that the housing or frame sleeve 11 is threaded at one end thereof, as indicated at 19, the threaded end being secured to the support 12 by means of a pair of nuts 20 and 21 adapted to cooperatively grip the support. A lock washer, as indicated at 22, may be interposed between one of the nuts and the support structure. The operating sleeve 14, longitudinally reciprocable within the housing sleeve, is provided at one end thereof, as will be best understood by reference to Fig. 6, with a pair of diametrically disposed slots 23, and adjacent the other end thereof with two series of circular perforations 24 and 25. In the particular embodiment illustrated, there are three perforations 24 and three perforations 25, equally disposed circumferentially of the sleeve, as will be best seen in Figs. 4 and 5 of the drawing. By means of the handle structure 13, the operating sleeve may be moved to various adjusted positions within the housing 11.

The holding or locking means for restraining the operating sleeve 14 from movement, and for effecting its release when adjustment thereof is desired, comprises two holding mechanisms, one cooperable with the series of perforations 24, and the other cooperable with the series of perforations 25. More specifically, a series of holding elements or balls 30 are arranged within the sleeve openings 24, these balls being adapted to be thrust into engagement with the interior surface of the housing sleeve 11 by means of a control member 31 having a conical inclined cam surface 32 engageable with the balls. This control member is threaded at one end thereof, as indicated at 33, Fig. 6, whereby to be secured to the internally threaded end 34 of a control sleeve 35 shiftable longitudinally within and relative to the operating sleeve 14. This control sleeve is externally threaded on its opposite end, as indicated at 36, and is also provided adjacent its externally threaded end with a pair of diametrically disposed slots 37. The threaded end 36 of the control sleeve has threaded connection with a handle member 38, forming a part of the handle structure 13, a cap-piece 39, also threadedly secured to the sleeve 35, forming a part of this handle member. The handle member 38 is also provided with a recess 40, Fig. 2, adapted to receive the end of the operating sleeve 14. The handle member 38, the control sleeve 35, and the control member 31, which are all rigidly secured together after assembly and during the operation of the mechanism, form a composite control structure for operating the holding elements or balls 30. More particularly, upon longitudinal movement of this control structure relative to the operating sleeve 14, the balls 30 will be thrust into holding engagement with the interior surface of the frame sleeve 11, or released therefrom, as the case may be.

The second holding means, cooperable with the operating sleeve openings 25, comprises a series of balls 45 arranged within the openings and adapted to be thrust into holding engagement with the interior surface of the housing sleeve 11 by means of a control member 46 having a conical or inclined cam surface 47 engageable with the balls. The control member 46 has a threaded bore as indicated at 48, Fig. 6, whereby the member may be secured to the threaded end 49 of a control rod 50. This control rod is loosely received within a bore 51 formed through the control member 31, so that the control rod and its associated parts may be independently longitudinally shifted, relative to the operating sleeve 14. The opposite end of the rod 50 is threaded, as indicated at 52, Fig. 6, for threaded connection to a fitting 53 having an internally threaded end as indicated at 54. The fitting is also provided, near one end thereof, with a vertically extending bore 55. This bore is adapted to receive a pin 56 secured within a handle member 57 forming a part of the handle structure 13. The pin 56 loosely passes through the slots 23 of the sleeve 14 and the slots 37 of the sleeve 35 so as not to interfere with the independent shifting of the sleeve 35, and the pin, relative to the operating sleeve 14. The handle member 57 is provided with a pair of oppositely extending finger engagement projections 58, and with an inwardly or forwardly extending sleeve portion 59 adapted to form an abutment stop against the nut 20 in the forward or inward shifted position of the control mechanism.

It will be seen that the handle member 57, together with its associated parts comprising the fitting 53, the control rod 50, and the control member 46, all of which form an integral structure after assembly and during operation of the mechanism, constitute a composite control structure for operating the holding elements or balls 45 of the second holding or locking mechanism.

A compression spring 60 is arranged within the sleeve 35, adjacent one end thereof. This compression spring engages at one end against the cap member 39 and at its other end against the fitting 53.

In the operation of the structure, normally the compression spring 60 urges the handle members 38 and 57 relatively away from each other, whereby to urge the control member 31 to the left and the control member 46 to the right, as seen in Figs. 1, 2 and 3, bringing the cam surfaces on the control members firmly into engagement with the holding balls and urging the latter into holding position. This condition of the parts is illustrated in Fig. 2. As the balls are urged by the inclined cam surfaces into holding engagement with the interior surface of the housing sleeve 11, the entire control mechanism is held or locked from movement. More particularly the control members 31 and 46, being tightly wedged into engagement with the balls, are constrained from movement, thus holding the handle members 38 and 57 in fixed position, the holding elements or balls 30 and 45 being wedged into gripping engagement with the housing sleeve 11, constraining the operating sleeve 14 from movement, by reason of the arrangement of the balls within the sleeve openings 24 and 25.

It will be noted that in accordance with the invention two holding units are provided associated with and including the balls 30 and 45, respectively. Moreover, the control members 31 and 46 are arranged so that the tapered surfaces thereof are relatively oppositely disposed, the tapered surface 32 on the member 31 increasing or becoming more effective to the right, and the tapered surface 47 on the member 46 increasing or becoming more effective to the left. If attempt is made to force the operating sleeve 14 outwardly, to the left as seen in Figs. 1, 2 and 3, the attempted movement of the sleeve tends to induce rotation of the balls 30, as they attempt to roll to the left along the interior surface of the housing sleeve 11, in such a manner that the balls tend to roll or climb upwardly on the inclined cam surface 32 into more effective holding position, tending to shift the control member 31 to the left and producing a substantially positive lock. Similarly if attempt is made to force the operating sleeve 14 inwardly or to the right as seen in Figs. 1, 2 and 3, such motion tends to cause the holding balls 45 to climb up the inclined cam surface 47 of the control member 46 into more effective holding position, the control member and the balls 45 thus producing a substantially positive lock against movement of the operating sleeve in the inward direction.

Each of the come-like locking devices 31 and 46, with its cooperating balls, provides a very effective uni-directional locking or holding mechanism, and the opposite disposition of the two devices in the assembled structure provides a composite holding or locking arrangement effective to resist forces tending to move the operating sleeve 14 in either direction of its travel, with substantially positive locking effectiveness. Further the efficiency of the holding units provides adequate holding forces with the use of a relatively light spring 60. The tension of spring 60, together with the angularity of the taper of the conical surfaces 32 and 47, determines the efficiency of the holding action, and these elements may be varied to produce the degree of holding effectiveness required. At the same time, efficient holding may be obtained with the use of a lighter spring pressure, as stated. This use of a lighter spring permits the more ready release of the holding means. Smoother and more uniform and reliable operating characteristics are provided. The characteristic of the holding or locking action may be made substantially uniform in the opposite directions of travel of the operating sleeve, if the holding units, including the angularity of the tapered surfaces 32 and 47, number of holding balls, et cetera, are substantially uniform.

To effect the release of the operating sleeve 14, for movement in either direction, the handle members 38 and 57 are gripped and moved relatively toward each other, compressing the spring 60, and moving the control members 31 and 46 relatively toward each other to release the holding balls. The shaping of the handle members 38 and 57, including the oppositely extending projections 58 on the handle member 57, enables the two handle parts to be relatively gripped together within the operator's hand. To this end the palm of the hand may be engaged against the handle member 38 and the fingers engaged with the extensions 58 of the handle 57.

As the handle members are gripped relatively toward each other, the socket 40 of the handle member 38 may be brought into engagement with the end 14a of the operating sleeve, whereas the pin 56 associated with the handle member 57 may be brought into engagement with the end 23a of the sleeve slot 23. By this means, while the operating sleeve 14 is not rigidly connected with the handle members, it may become positively associated therewith or gripped thereby during adjustment operations, whereby to effect the accurate positioning of the operating sleeve.

It is obvious that various changes may be made in the specific embodiment set forth for purposes of illustration without departing from the spirit of the invention. The invention is accordingly not to be limited to the precise embodiment shown and described, but only as indicated in the following claims.

The invention is hereby claimed as follows:

1. A control mechanism comprising a frame sleeve adapted to be secured to a support, an operating member shiftable within the frame sleeve and adapted to be connected to a device to be controlled, and a plurality of holding means for releasably holding the operating member from movement with respect to the frame sleeve, each of said holding means comprising a control member shiftable within the frame sleeve and having an inclined cam surface, and a holding element controlled by said surface and adapted to be thrust thereby into engagement with the interior surface of the frame sleeve.

2. A control mechanism comprising a frame adapted to be secured to a support, an operating member shiftable in opposite directions relative to the frame and adapted to be connected to a device to be controlled, and a plurality of holding means for releasably holding the operating member from movement with respect to the frame, each of said holding means having greater resistance to movement of the operating member in one direction than in the other, and said holding means being oppositely disposed whereby one holding means provides maximum holding effectiveness against movement of the operating member in one direction, and the other holding means provides maximum holding effectiveness against movement of the operating member in the opposite direction, and concentrically disposed operating connections including a plurality of independently shiftable manual control handles for controlling said holding means.

3. A control mechanism comprising a frame sleeve adapted to be secured to a support, an operating sleeve shiftable in opposite directions within the frame sleeve and adapted to be connected to a device to be controlled, and a plurality of holding means for releasably holding the operating sleeve from movement with respect to the frame sleeve, each of said holding means providing greater resistance to movement of the operating sleeve in one direction than in the other, and said holding means being oppositely disposed whereby one holding means provides its maximum resistance to movement of the operating sleeve in one direction of travel and the other holding means provides its maximum resistance to movement of the operating sleeve in the opposite direction of travel, and concentrically disposed operating connections including a plurality of independently shiftable manual control handles for controlling said holding means.

4. A control mechanism comprising a frame sleeve adapted to be secured to a support, an operating member shiftable in opposite directions within the frame sleeve and adapted to be connected to a device to be controlled, and a plurality of holding means for releasably holding the operating member from movement with respect to the frame sleeve, each of said holding means comprising a control member shiftable within the frame sleeve and having an inclined cam surface, and a holding element controlled by said surface and adapted to be thrust thereby into engagement with the interior surface of the frame sleeve, the inclined cam surfaces of said control members being relatively oppositely disposed.

5. A control mechanism comprising a frame sleeve adapted to be secured to a support, an operating sleeve shiftable in opposite directions within the frame sleeve and adapted to be connected to a device to be controlled, and a plurality of holding means for releasably holding the operating sleeve from movement with respect to the frame sleeve, each of said holding means comprising a control member shiftable within the operating sleeve and having a conical inclined cam surface, and a plurality of holding elements controlled by said surface and adapted to be thrust thereby into engagement with the interior surface of the frame sleeve, the conical inclined cam surfaces of said control members being relatively oppositely disposed.

6. A control mechanism as defined in claim 5 wherein the plurality of holding elements comprises a series of rotatable members substantially equally disposed circumferentially of said conical inclined cam surface.

7. A control mechanism comprising a frame adapted to be secured to a support, an operating member shiftable relative to the frame and adapted to be connected to a device to be controlled, and a plurality of independently operable holding means for releasably holding the operating member from movement with respect to the frame, each of said holding means comprising a shiftable control member, an inclined cam surface, a holding element controlled by said surface and adapted to be forced thereby into engagement with the frame, a handle member secured to each control member, and concentrically disposed operating connections between each handle member and its connected control member.

8. A control mechanism as defined in claim 7 wherein said handle members are movable relatively toward each other to move the holding means to released position.

9. A control mechanism comprising a frame sleeve adapted to be secured to a support, an operating member shiftable within the frame sleeve and adapted to be connected to a device to be controlled, and a plurality of independently operable holding means for releasably holding the operating member from movement with respect to the frame sleeve, each of said holding means comprising a control member shiftable within the frame sleeve, an inclined cam surface, a holding element controlled by said surface and adapted to be thrust thereby into engagement with the interior surface of the frame sleeve, and a handle member secured to the control member.

10. A control mechanism comprising a frame sleeve adapted to be secured to a support, an operating member shiftable within the frame sleeve and adapted to be connected to a device to be controlled, and a plurality of independently operable holding means for releasably holding the operating member from movement with respect to the frame sleeve, each of said holding means comprising a control member shiftable within the frame sleeve, an inclined cam surface, a holding element controlled by said surface and adapted to be thrust thereby into engagement with the interior surface of the frame sleeve, and a handle secured to the control member, the inclined cam surfaces being selectively oppositely disposed, and said handle members being movable relatively toward each other to move the holding means to released position.

11. A control mechanism comprising a frame sleeve adapted to be secured to a support, an operating member shiftable within the frame sleeve and adapted to be connected to a device to be controlled, and a plurality of independently operable holding means for releasably holding the operating member from movement with respect to the frame sleeve, each of said holding means comprising a control member shiftable within the frame sleeve, a conical inclined cam surface, a plurality of holding elements controlled by said surface and adapted to be thrust thereby into engagement with the interior surface of the frame sleeve, and a handle member secured to the control member, said conical inclined cam surfaces being relatively oppositely disposed, and said handle members being movable relatively toward each other to move the holding means into released position.

12. A control mechanism comprising an elongated frame adapted to be secured to a support, an operating member reciprocably shiftable axially of the frame and adapted to be connected to a device to be controlled, and a pair of holding means for releasably locking the operating member from movement in either direction with respect to the frame, each of said holding means comprising an inclined cam surface and a holding element controlled by said surface and adapted to be forced thereby into engagement with the frame, and a pair of juxtaposed relatively shiftable handles disposed adjacent one end of the frame for controlling the action of both of said holding means.

13. A control mechanism comprising an elongated frame adapted to be secured to a support, an operating member reciprocably shiftable axially of the frame and adapted to be connected to a device to be controlled, and a pair of holding means for releasably locking the operating member from movement in either direction with respect to the frame, each of said holding means comprising an inclined-cam surface and a holding element controlled by said surface and adapted to be forced thereby into engagement with the frame, and a pair of juxtaposed relatively shiftable handles disposed adjacent one end of the frame, said handles being shiftable relatively toward each other to simultaneously release both of said holding means.

14. A control mechanism comprising an elongated frame adapted to be secured to a support, an operating member reciprocably shiftable axially of the frame and adapted to be connected to a device to be controlled, and a pair of holding means for releasably locking the operating member from movement in either direction with respect to the frame, each of said holding means comprising an inclined cam surface, an elongated control member extending axially of the frame, and a holding element controlled by said surface and adapted to be forced thereby into engagement with the frame, said control members being disposed in parallel relationship and each of said control members being axially shiftable relative to each other to control the operation of said holding means.

15. A control mechanism comprising an elongated frame adapted to be secured to a support, an operating member reciprocably shiftable axially of the frame and adapted to be connected to a device to be controlled, and a pair of holding means for releasably locking the operating member from movement in either direction with respect to the frame, each of said holding means comprising an inclined cam surface, an elongated control member extending axially of the frame, and a holding element controlled by said surface and adapted to be forced thereby into engagement with the frame, and a pair of juxtaposed handles secured to said control members, said handles being relatively shiftable for controlling the action of both said holding means.

CALHOUN NORTON.